Jan. 1, 1946.  F. SMITH  2,392,270
STABILIZED PARACHUTE CONSTRUCTION
Filed Aug. 12, 1943

INVENTOR.
FLOYD SMITH
BY Albert Sperry
ATTORNEY.

Patented Jan. 1, 1946

2,392,270

UNITED STATES PATENT OFFICE 2,392,270

STABILIZED PARACHUTE CONSTRUCTION

Floyd Smith, Manchester, Conn., assignor to Pioneer Parachute Company, Inc., Manchester, Conn., a corporation of Connecticut Application August 12, 1943, Serial No. 498,391

4 Claims. (Cl. 244—142)

My invention relates to parachutes and methods of producing the same, and particularly to constructions wherein the swinging or oscillation of the parachute and its load is materially reduced.

Many persons have been injured in parachute descents due to landing while the parachute is oscillating or swinging from side to side. Under such conditions the force with which the user strikes the ground is greatly increased, whereas, it is extremely difficult for the user to guide the parachute or to prepare himself for landing when swinging from side to side or rotating with the parachute. This condition is rendered much more hazardous when descents are made at night or in fog, since the user then cannot see the ground and frequently does not realize that the parachute is oscillating or know the direction in which it is swinging with respect to the earth's surface.

The oscillation of parachutes occurs very frequently when descents are made in high winds or rough air or when the parachute descends from one strata of air to another. During such descents the parachute canopy may be tilted whereupon air is spilled from beneath the high side of the canopy and may even cause that side of the canopy to be partially collapsed. The lower and filled side of the canopy then descends relatively slowly while the collapsed or emptied side descends rapidly. The load then falls off center setting up a pendulum action which serves to increase or prolong the oscillations. It is almost impossible for the user to manipulate the parachute to overcome this condition once it has started and in most instances the user is not sufficiently familiar with the operation of a parachute or is unable to remedy a faulty descent.

In order to overcome these objections to prior parachutes, I have developed a new type of parachute construction in which the spilling of air on tilting of the canopy is reduced and oscillation thereof is markedly decreased. Furthermore, the construction is such that the tendency for the canopy to rotate during descent is reduced.

These results are obtained by forming the parachute with means which cause it to present a plurality of lobes or pockets during descent. These pockets tend to retain the air therein and prevent ready flow of the air from one portion of the canopy to another when the canopy is tilted. In this way the amount of air spilled from the canopy is reduced and oscillations of the parachute are quickly damped out. Moreover, the lobes of the canopy present surfaces which are sufficiently irregular to reduce rotation of the parachute during descent. The means employed for forming the lobes preferably consist in a novel arrangement of the suspension lines and canopy such that certain portions of the canopy are permitted to expand outwardly and upwardly during descent farther than other portions of the canopy.

It has been suggested heretofore that square or other angularly formed parachutes be used but in such constructions the length of the suspension lines used has been such that the upward bellying of the canopy during descent is substantially the same on all sides thereof and as a result no lobes or pockets are formed in the canopy and the spilling of air upon tilting of the canopy is not materially lessened. Oscillation of parachutes so constructed is therefore reduced but little if any.

One of the objects of my invention is to provide a novel type of parachute construction which is relatively stable in descent and tends to reduce oscillation or swinging of the parachute and its load.

A further object of my invention is to provide a parachute canopy with novel means forming a plurality of lobes or pockets therein which restrict the flow of air from one portion of the canopy to another and thereby reduce the spilling of air from the canopy on tilting thereof.

A further object of my invention is to provide a parachute canopy of predetermined outline with means for restricting certain portions of the canopy so as to impart a different outline thereto during descent whereby a plurality of lobes or pockets are formed in the canopy to restrict the spilling of air therefrom.

A particular object of my invention is to provide a parachute with a canopy and suspension lines so formed and arranged that the suspension lines draw the canopy inward to a greater extent at one point or portion about the skirt than at another so that a plurality of lobes or pockets are formed in the canopy during descent whereas no additional or extraneous elements are used which might interfere with the extraction of the parachute from its pack or the proper opening thereof during descent.

These and other objects and features of my invention will appear from the following description thereon in which reference is made to the figures of the accompanying drawing.

Figure 1:
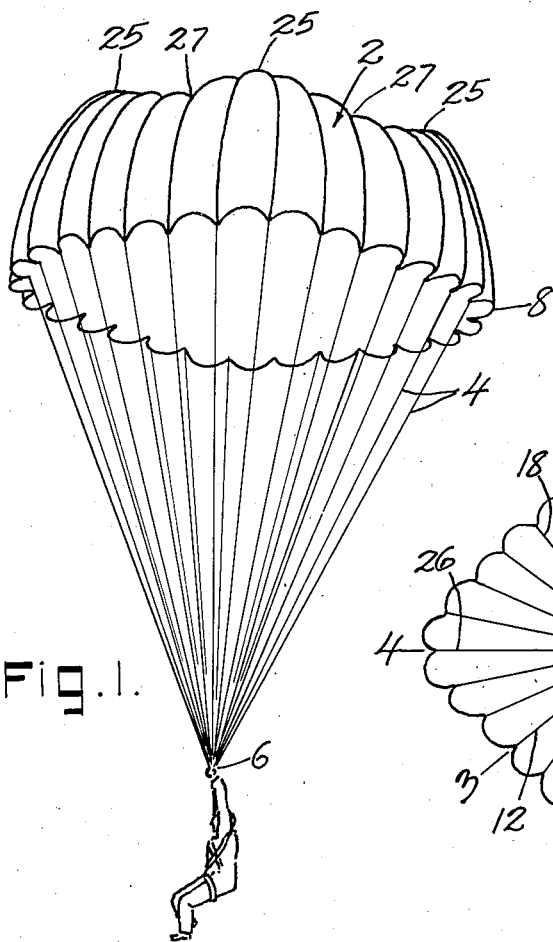
Fig. 1 is a perspective of a typical form of parachute embodying the present invention.

In that form of my invention illustrated in Figs. 1 to 4 of the drawing the parachute is provided with a canopy 2 which preferably is of conventional circular outline but may be of any other desired shape. Suspension lines 4 are connected to the canopy and to means for supporting a load which are indicated at 6 and may be the usual harness worn by the user.

The suspension lines preferably extend from the support 6 to the skirt 8 of the canopy 2, then upward over the canopy to the vent 10 in the peak thereof. The lines then pass across the vent and down over the opposite side of the canopy and back to the support 6. However, the suspension lines may extend only to the vent in the peak of the canopy and may be secured to the canopy in any of various ways.

In order that the canopy may have the desired lobes or pockets formed therein during descent, means are provided which prevent outward and upward movement of one portion of the canopy while permitting greater outward and upward movement of other portions thereof under the action of air thereon. The means employed preferably are the suspension lines and in any event are means which are located on the exterior of the canopy so that they do not extend across the canopy interially thereof or in such a way as to present any possibility of entanglement with the suspension lines or otherwise interfere with the normal opening of the canopy.

Figure 2:
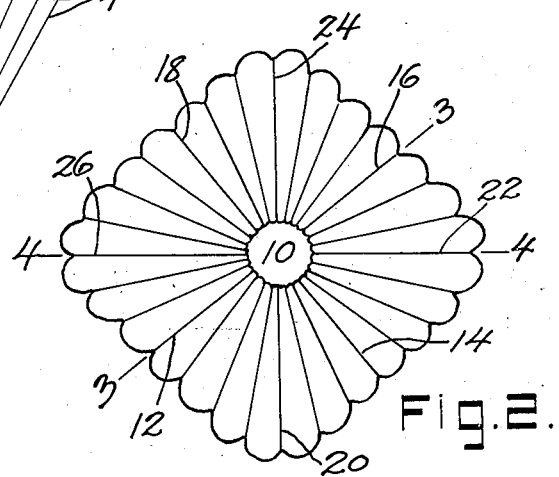
Fig. 2 is a plan view of the parachute canopy illustrated in Fig. 1.
Figure 4:
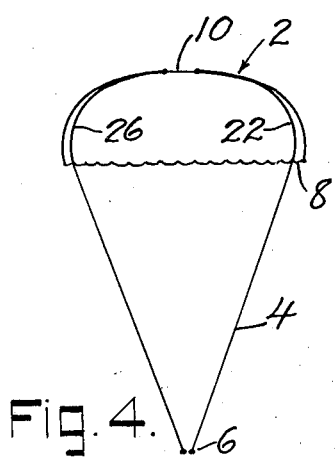
Fig. 4 is a vertical sectional view of the construction illustrated in Figs. 1 and 2 taken on the line 4—4 of Fig. 2.

In accordance with the preferred form of my invention a circular canopy is used and the formation of lobes in the canopy and the restriction thereof to a non-circular form is effected by forming certain of the suspension lines shorter than others and of such length that the canopy is drawn in at a plurality of points about its circumference and allowed to expand outward at other points. The canopy is thus rendered irregular in outline during descent. The longer suspension lines serve to permit the formation of the lobes between the restricted portions of the canopy. Thus, as shown in Fig. 2 I may use a plurality of series of suspension lines of different length about the canopy. The lines of each series form one lobe and in passing about the canopy they progress from the shortest lines to the longest lines and back to the shortest lines again. The shortest lines in the series are indicated at 12, 14, 16 and 18 in Fig. 2 whereas the longest lines are indicated at 20, 22, 24 and 26. With this construction and progressing in a clockwise direction about the canopy from the line 12 to the line 20, the suspension lines are successively shorter and shorter, whereas, in continuing on from the suspension line 20 to the suspension line 14 the length of the lines increases. The lines between 12 and 14 therefore form one lobe or pocket in the canopy when the parachute is in use. The lines between 14 and 16 form a second lobe, those between 16 and 18 form a third lobe and those between 18 and 12 form a fourth lobe. The four lobes 25 and four restricted portions 27 of the canopy thus give the canopy a generally square or non-circular shape when in use and the four pockets serve to prevent free flow of air from one portion thereof to the other when the canopy is tilted. Furthermore the irregular form of the canopy and the projecting lobes thereon also serve to prevent or slow down any rotation of the parachute. Descent of the parachute is therefore stabilized and oscillation and rotation thereof is rapidly damped out.

In a typical construction of this character when using a standard circular parachute canopy 28 feet in diameter constructed to provide four lobes during descent, the length of adjacent lines between the support 6 and the skirt 8 of the canopy varied by 6 inches, the length of adjacent lines between the skirt 8 and vent 10 varies by six inches and the length of adjacent lines extending across the vent vary by 2 inches. The total length of each line in passing from the support 6 over the canopy, across the vent and back on the opposite side of the canopy to the support 6 is therefore 26 inches shorter or longer than each of the lines adjacent thereto. Parachutes so constructed have been found in practice to produce very marked damping of the oscillation of the parachute during descent and to be much more stable than conventional circular parachutes when used in high wind and rough air and during normal descent thereof. The canopy when in use presented four very marked lobes or pockets which trapped the air and prevented ready spilling thereof from one portion of the canopy to the other, when the canopy tilted in a high wind.

Figure 5:
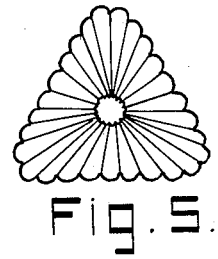
Fig. 5 is a plan view of an alternative construction embodying the present construction.

In an alternative construction used the canopy had the form indicated generally in Fig. 5 and had substantially a triangular shape during descent. In the latter case the length of the lines between the support and skirt varied by three inches, the length of the lines between the skirt and the peak of the canopy varied by 3 inches, and the length of the lines extending across the vent varied by 1 inch.

Figure 3:
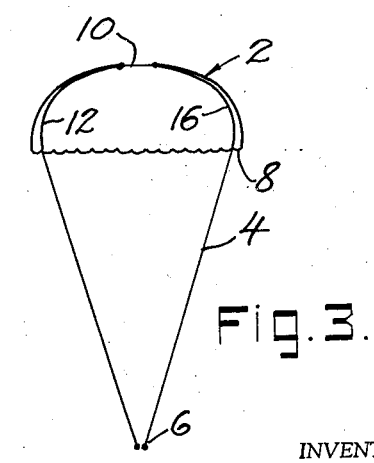
Fig. 3 is a vertical sectional view of the parachute illustrated in Figs. 1 and 2 taken on the line 3—3 of Fig. 2.

In either of these constructions the form of the canopy taken on a line passing through the shortest suspension line is of the general form indicated in Fig. 3. The skirt is drawn inward and the canopy is flatter and has a larger radius of curvature than the corresponding portions of the canopy wherein the longer suspension lines are used. The form of the canopy taken on a section on the longer line is of the general shape indicated in Fig. 4.

The essential feature of my invention resides in the use of a canopy with restricting means therefore that cause the canopy to assume a form during descent which is substantially different from that given to the fabric of the canopy in forming the same. Thus in the preferred form of the invention illustrated a conventional circular canopy is employed whereas the suspension lines restrict the canopy to a generally square or triangular outline when the parachute is in use. The additional material resulting from the restriction of the circular canopy to a square or triangular form provides the upwardly projecting pockets or lobes on the canopy. These lobes would not be present if the canopy initially were of a square form or were otherwise shaped to conform generally to its shape during descent. However, it should be understood that it is not essential to the present invention that the canopy be of circular form, since a canopy of square form may be provided with suspension lines arranged to give the canopy a circular form during descent. Similarly, other forms and arrangements of the suspension lines and other types of restricting means may be employed for shaping the canopy during descent to provide the desired lobes or pockets therein.

In view of these and the numerous other modifications and changes which may be made in the form, construction and arrangement of the elements used in producing parachutes embodying my invention, and in the methods of assembling the same, it should be understood that the preferred forms of my invention illustrated in the drawing and herein described are intended to be illustrative only and are not intended to limit the scope of the following claims.

I claim:

1. A parachute having a canopy of circular outline with suspension lines connected to said canopy and to means for supporting a load, said suspension lines varying progressively in length from a maximum to a minimum a plurality of times in passing from one to another about the canopy whereby when in use the canopy will assume a non-circular outline and present a plurality of upwardly extending lobes.

2. A parachute having a canopy of circular outline with suspension lines connected to said canopy and to means for supporting a load, the length of said suspension lines connected to the canopy varying progressively in length from a maximum to a minimum a plurality of times in passing from one to another about the canopy whereby when in use the canopy will assume a non-circular outline and present a plurality of upwardly extending lobes.

3. A parachute having a canopy of circular outline with suspension lines connected to said canopy and to means for supporting a load, the length of said suspension lines between said means and the skirt of said canopy varying progressively in length from a maximum to a minimum a plurality of times in passing from one to another about the canopy whereby when in use the canopy will assume a non-circular outline and present a plurality of upwardly extending lobes.

4. A parachute comprising a canopy of generally circular outline having suspension lines connected thereto and to a means for supporting a load, the portion of said suspension lines attached to the canopy varying in length progressively from the shortest length to the longest length and back to the shortest length a plurality of times in passing about the canopy and the length of the suspension lines between said means and the skirt of the canopy varying in a similar manner, whereby the canopy when in use is irregular in shape and presents a plurality of upwardly extending lobes.

FLOYD SMITH.